United States Patent [19]

Nathan

[11] 4,450,900
[45] May 29, 1984

[54] MOBILE AIR CONDITIONING UNIT

[76] Inventor: Norman Nathan, 3115 Montmorency, Longueuil, Quebec J4L 4C6, Canada

[21] Appl. No.: 235,975

[22] Filed: Feb. 19, 1981

[51] Int. Cl.³ .............................................. B60H 3/00
[52] U.S. Cl. ...................................... 165/42; 62/237;
62/239; 55/267; 55/316
[58] Field of Search ................... 165/41, 42, 5, 45, 48;
55/267, 316; 34/49; 62/237, 271, 419, 239

[56] References Cited

U.S. PATENT DOCUMENTS

| | | | |
|---|---|---|---|
| 3,036,382 | 5/1962 | Shotton, Jr. | 165/41 |
| 3,672,445 | 6/1972 | Carson | 165/42 |
| 3,914,955 | 10/1975 | McCullough | 165/41 |
| 3,964,458 | 6/1976 | Strauss et al. | 165/41 |
| 3,988,131 | 10/1976 | Kanazawa et al. | 55/316 |
| 4,049,404 | 9/1977 | Johnson | 55/316 |

FOREIGN PATENT DOCUMENTS 1138321  1/1957  France ................................... 34/49

Primary Examiner—Albert J. Makay
Assistant Examiner—Henry Bennett
Attorney, Agent, or Firm—Larson and Taylor

[57] ABSTRACT

A mobile unit for use in a remote enclosed space is disclosed. The unit not only heats or cools the air but also filters out toxic gases, it also is easily handled and extremely mobile. The unit is in the form of an open trailer comprising an air entry having a purifying means to remove toxic gases, cooling means, dehumidifying means and heating means. A ducting system from the air entry connects the purifying means, cooling means, dehumidifying means and heating means to an air exit. Fan means in the unit circulate air in the ducting system from the air entry to the air outlet, and the removable flexible conduits connect the air entry and the air exit to the enclosed space.

8 Claims, 3 Drawing Figures

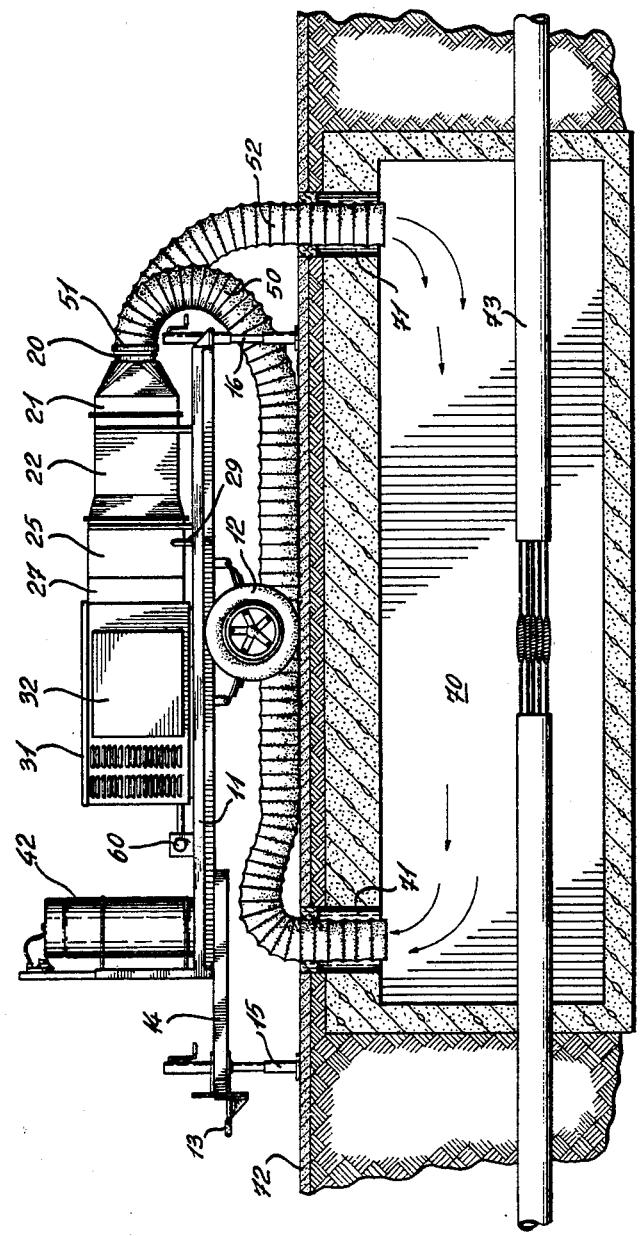

MOBILE AIR CONDITIONING UNIT

This invention relates to a mobile unit for conditioning air in enclosed spaces. More specifically the present invention relates to a mobile air heater, conditioner and purifier.

It is often necessary to control the atmospheric conditions in enclosed spaces while working in these spaces. For example, underground work chambers are provided for servicing underground utility lines within these chambers. The chambers, when not regularly used, become very damp and cold. In addition, toxic gases collect in the chambers. In the case of utility lines, there is the requirement to splice cables or join pipes which requires the use of heat resulting in fumes, smoke and other toxic gases which must be removed. In order to work comfortably in these chambers, it is necessary to purify, and often replace the air for the entire time a service man is in the chamber. It is also necessary to either heat, cool or dehumidify the air. Other examples of enclosed spaces requiring controlled atmospheres include aircraft, transport trailers, radar stations and mining tunnels.

It is known to provide portable pieces of equipment to condition the air in these chambers. For example, it is known to provide portable blowers to ventilate the chambers. These blowers may also heat the chambers. However, the handling of these blowers for transportation and set-up is quite labour-intensive. In addition, several different types of equipment, also requiring labour intensive handling may be needed if the air in the chambers is to be filtered, cooled, or dehumidified.

To avoid the handling of one or more pieces of portable equipment it is known to install conditioning units in a work trailer. The trailer is then driven to the site and connected, along with its conditioning units, directly to the work chamber. Such a unit is shown in U.S. Pat. No. 3,914,955 issued to McCullough. Since the conditioning units are permanently installed in the work trailer only the work trailer need be handled, thereby eliminating individual handling and set-up of the conditioning units.

The known trailer unit has certain disadvantages, however. Since it incorporates a work area, the trailer is large and bulky and thus awkward to handle. Consequently, a lot of time must be spent in setting up the trailer at the work site, and furthermore, many underground chambers do not have sufficient space above for setting up a trailer of this type. The access openings to such a chamber are often against a wall, or have different spacings between access holes making connection to the trailer all but impossible.

Another disadvantage of the known trailer unit is the complexity of the conditioning means. Since both the work chamber and the work area in the trailer are to be conditioned, no simple in-line flow-through system can be employed for circulating and replenishing the air. The complex system employed makes the trailer relatively expensive.

It is further noted that no provisions are provided in the trailer unit for handling any toxic gases which may have accumulated or are produced in the work chamber. These toxic gases would merely be recirculated through both the work chamber and the work area in the trailer creating an unpleasant, and possibly dangerous working environment.

It is the purpose of the present invention to provide a compact extremely mobile unit with means thereon for conditioning air in enclosed spaces.

It is a further purpose of the present invention to provide a mobile conditioning unit which more thoroughly conditions the air, including removing toxic gases from the air, as compared with known units, and which do not filter the air other than by standard throw-away type filters.

In accordance with the present invention there is provided a compact trailer unit having an open platform on which the necessary conditioning units are mounted. The conditioning units include heating, cooling, dehumidifying and purifying means connected in series on the platform with duct means. Flexible conduits are employed to connect the duct means with the work chamber thereby eliminating the need to exactly position the trailer unit. Heating can be provided by means of natural gas, propane gas or electrical power.

In a preferred embodiment a heat pump is provided on the trailer. The heat pump is a basic air conditioner operating in reverse. The unit is installed to eliminate the need for combustion by using the reversing valve method known to those skilled in the art of heat pumps. The energy conservation aspect of the unit is greatly enhanced by use of the heat pump.

The trailer unit is small enough and compact enough to be easily handled and positioned, even in tight spaces. All the conditioning units are readily accessible for maintenance, servicing and operation. The electrical power to the unit can be externally supplied. Alternatively, an electrical power generating source, such as a gasoline or diesel generator, can be mounted directly on the open platform. Heating fuel, in the form of gas, propane or natural, can also be carried on the platform. The invention provides a self-contained, mobile, conditioning unit which is relatively inexpensive to construct and maintain yet easy to handle and set up.

The present invention provides a mobile unit for use in conditioning air in a remote enclosed space having at least one opening therein, the unit being in the form of an open trailer comprising, an air entry having a purifying means to remove toxic gases and filter airborne particles, cooling means, dehumidifying means and heating means, ducting system from the air entry connecting the purifying means, cooling means, dehumidifying means and heating means to an air exit, fan means within the ducting system to circulate air from the air entry to the air outlet, and two removable flexible conduits for connecting the air entry and the air exit to the enclosed space.

In drawings which illustrate embodiments of the invention,

FIG. 2 is an elevational view, in partial section, showing the unit used for conditioning a remote chamber.

Figure 1:
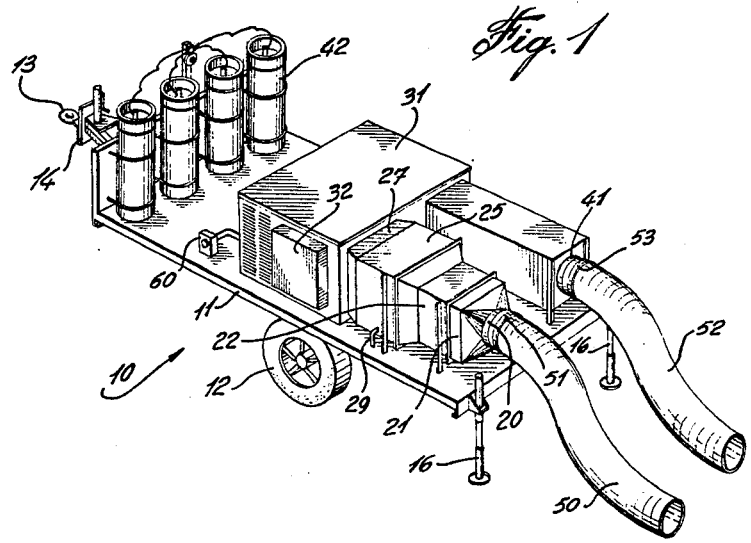
FIG. 1 is a perspective view of the mobile unit.

Referring now to FIGS. 1 and 2, the mobile unit 10 has a platform 11 mounted on a pair of wheels 12. The wheels 12 are located off the centre of the platform. The trailer hitch 13 is mounted on a front support frame 14 projecting from the front end of the platform 11. A front support stand 15, which is adjustable in height, supports the front end of the platform 11 when the unit 10 is parked in operating position. The front support stand 15 can be raised by suitable means (not shown) when the unit 10 is to be moved. In another embodiment, the front support stand 15 may be a wheel for moving the trailer by hand. A levelling stabilizer 16 such as a jack, is provided at each side of the rear of the platform 11 to help level the unit 10 when parked on uneven ground.

Figure 3:
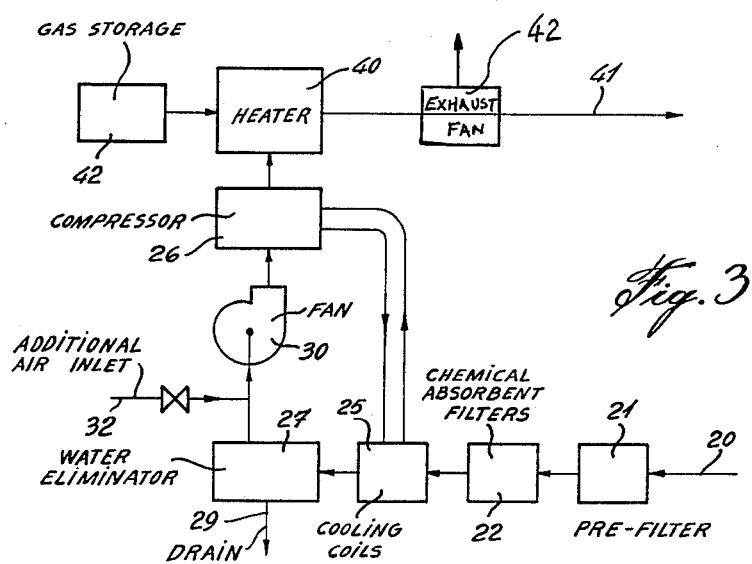
FIG. 3 is a block diagram indicating the air flow through the unit.

The air conditioning devices are mounted on the platform 11. These devices are installed in line from an air entry 20 as shown in FIG. 3. First a pre-filter 21 removes any large particles entering the conditioner, then chemical absorbent filters 22 remove odors and toxic gases. These filters 22 are disposable and may be replaced at regular intervals depending upon operation of the unit. In another embodiment, the chemical absorbent filters 22 may be replaced by electrostatic filters to remove all airborne particles in the air.

The air then passes through an air cooler 25 having coils cooled by a compressor 26 located further on in the system. A water eliminator 27 is next in line to remove moisture in the air. A drain 29 from the water eliminator 27 collects the condensed water and disposes of it on the ground.

An air circulating fan 30 is provided in a single duct unit 31 as shown in FIGS. 1 and 2. An additional air inlet 32 having adjustable louvers therein provides for fresh air to be drawn into the fan 30 and circulated through the unit. Fresh air varying from about 8 to 30% of the total circulating air may be introduced into the unit. Additional fresh air ensures that a similar amount of air is exhausted and not recirculated. The adjustable louvers or damper may be manually operated or automatically operated from a temperature controller in the air duct 31.

The compressor 26 for the cooling coils 25 is shown located in the air duct 31 at this point to act as a heat pump and to save energy by heating the air at the compressor and cooling it prior to the water eliminator. In some cases the heat from the compressor 26 can eliminate the need for the heater 40. In another embodiment the compressor may be located outside the duct 31 and heat only the environmental air, depending upon the temperature of the ambient air. For instance in a hot climate, there would be no need to have the compressor 26 in the air duct 31.

A gas fired heater 40 also in the air duct 31 heats the air before it reaches the air outlet 41. Containers 42 of gas are stored at one end of the platform. A gas gauge (not shown) is provided to indicate the quantity of gas remaining in the containers 42.

In one embodiment an exhaust fan 43 is positioned before the air outlet 41 in the system after the heater 40 as shown in FIG. 3. The exhaust fan 43 may be used intermittently to remove excessive fumes. The exhaust fan 42 is connected directly to the outlet duct and has manual or motorized dampers. The exhaust fan 43 is shown positioned before the outlet, but may also be located at the air inlet 20.

A first flexible conduit 50 is provided for connection to the air inlet 20 of the unit 10. A suitable quick connect coupling 51 is employed to connect the conduit 50 to inlet 20. A second flexible conduit 52 is provided for connection to the air outlet 41 of the unit 10. Again, a suitable quick connect coupling 53 is employed to connect the conduit 52 to the outlet 41. The conduits 50, 52 can be stored in suitable holders on the platform, disconnected from the air inlet 20 and air outlet 41, during travel or storage. The conduits 50, 52 are only connected to the unit 10 during use.

An electrical power connection 60 is provided on the unit 10 for connection to an external source of power. Suitable wiring is provided on the unit to connect the power connection 60 to the motors for the fan 30 and the compressor 26 for the air cooler 25. In another embodiment, a gasoline or diesel powered generator may be mounted on the platform 11 to provide the necessary electrical power.

In use, as illustrated in FIG. 2, the unit 10 is towed to the site where it is to be used, such as an underground utility service chamber 70. Such chambers usually have at least two access openings 71 to the surface 72 which openings are normally closed by covers. Utility cables or pipes 73 pass through the chamber 70 and connections, or changes in connections, in the cables 73 can be made in the chamber 70. To provide suitable working conditions within the chamber 70 the unit 10 is first positioned close to the chamber and levelled. The flexible conduits 50, 52 are then removed from their storage area on the platform and connected to the air inlet 20 and air outlet 41. The free end of the inlet conduit 50 is placed in one opening 71 of the chamber 70 and the free end of the outlet conduit 52 is placed in the other opening 71 and both conduits are sealed to avoid contamination by outside air. The unit 10 is plugged into a source of electrical power or else the motor-generator is started.

In another embodiment the inlet conduit 50 and outlet conduit 52 are connected to a concentric diffuser which may be installed within the chamber. In this manner both conduits can pass through a single access opening.

During operation, the fan 30 circulates air from the service chamber 70 through the unit 10 via the conduits 50, 52. Toxic gases and/or odors are removed from the circulating air in the purifying system. Thermostats in the air duct determine whether the air should be heated or cooled, and this is automatically carried out. Similarly a humidistat determines the humidity of the air and whether or not the dehumidifier is required. The speed of the fan may be varied to change the flow of air through the unit. It is required to change the air in the chamber preferably 20 times an hour and for standard size chambers the fan and duct size are designed accordingly.

To economize on cooling, it is sometimes preferred to bring in as much as 30% of outdoor air into the unit. The unit operates at ambient temperatures as low as 0° F. and maintains a working temperature of above 60° F. within the chamber. Heating capacities can vary from about 80,000 to 372,000 BTU or higher. Cooling capacities can vary from about 36000 to 180,000 BTU or higher.

The operation of the unit is controlled from operating controls (not shown) where variable controls enable temperature and humidity to be selected. The controls include mechanical and electrical devices preferably solid state, to maintain temperature and humidity at preset levels. Monitoring devices such as temperature and humidity recorders may also be provided.

Various changes may be made to the conditioning unit, for instance wherein a gas heating system is disclosed, this could be replaced with an electric or heat pump heating system. Controls can vary from standard controls to sophisticated solid state controls.

The units are insulated against sound and condensation and in one embodiment a three speed fan is employed. Time elapsed meters are fitted to the control panel to record the number of hours the unit is operated. In another embodiment water cooled units may be installed connecting the city water to avoid the necessity of a condensor for the cooling coils. Air flow flexible conduits are made from flame resistant materials and can be made in the range of about 8–18 inches diameter or more.

The embodiments of the invention in which an exclusive property or privilege is claimed, are defined as follows:

1. A mobile unit for use in conditioning air in a remote enclosed space having at least one opening therein, the unit being in the form of an open trailer comprising, an air entry having a purifying means to remove toxic gases, cooling means, dehumidifying means and heating means, ducting system from the air entry connecting in series the purifying means, cooling means, dehumidifying means, and heating means to an exit, fan means in the unit to circulate air in the ducting system from the air entry to the air outlet, a compressor in the ducting system connected with the cooling means and a duct from said dehumidifier through the hot section of said compressor and connected to said heater to provide a heat pump to preheat the air after cooling, an additional air inlet in the ducting system for selectively adding fresh makeup air, an exhaust fan located at the air entry, or the air exit, to remove excessive fumes from the enclosed space, and two removable flexible conduits for connecting the air entry and the air exit to the enclosed space.

2. The mobile unit as claimed in claim 1, wherein the purifying means includes an electrostatic air cleaner for removing airborne particles.

3. The mobile unit as claimed in claim 1, wherein the heating means includes a gas fired heater and wherein containers of gas are stored on the open trailer.

4. The mobile unit as claimed in claim 3, including connection for exterior electrical power for the fan means and a compressor for the cooling means.

5. The mobile unit as claimed in claim 3, including a gasoline or diesel powered generator mounted on the open trailer to provide electrical power for the fan means and a compressor for the cooling means.

6. The mobile unit as claimed in claim 1, including means on the open trailer for electrical power connection to an external source of electrical power.

7. The mobile unit as claimed in claim 1, including means for detachably connecting the conduits to the air entry and air exit, and storage means on the platform for storing the conduits when not connected to the air entry and air exit.

8. The mobile unit according to claim 1 including a temperature and humidity recorder.

* * * * *